Aug. 21, 1956  C. K. MOREHOUSE ET AL  2,759,986
PRIMARY CELL
Filed Nov. 20, 1953
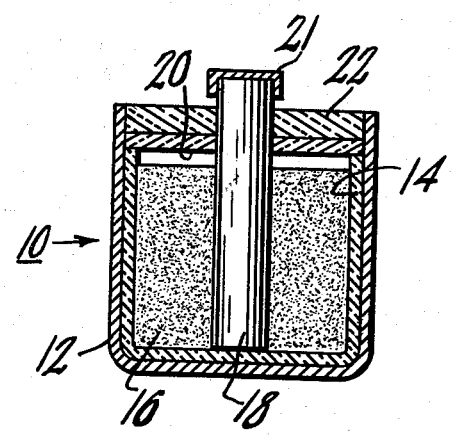
INVENTORS
CLARENCE K. MOREHOUSE
& RICHARD GLICKSMAN
BY
ATTORNEY

United States Patent Office 2,759,986
Patented Aug. 21, 1956

2,759,986
PRIMARY CELL

Clarence K. Morehouse, Princeton, and Richard Glicksman, Highland Park, N. J., assignors to Radio Corporation of America, a corporation of Delaware Application November 20, 1953, Serial No. 393,386

The terminal 15 years of the term of the patent to be granted has been disclaimed 5 Claims. (Cl. 136—100)

This invention relates to primary cells.

The general object of this invention is to provide an electrolytic cell for the generation and storage of electrical energy and more particularly to a primary electric current producing cell consisting of a novel electrochemical system.

Another object of this invention is to provide a novel primary cell capable of supplying a substantially constant current at a favorable voltage level for long periods of time.

A further object of the invention is to provide a novel primary cell with an improved capacity.

Still another object of this invention is to provide an electrical cell including a novel combination of electrodes.

In general, the foregoing and other objects and features of the invention may be accomplished by a novel cell which includes a cathode consisting essentially of sulfur in combination with an aqueous magnesium bromide electrolyte, and an anode consisting essentially of magnesium or a magnesium base alloy.

The invention is described in greater detail by reference to the drawing of which the single figure is a sectional, elevational view of a typical primary cell embodying the principles of the invention.

Referring to the drawing, a typical dry-type primary cell 10, which includes the electrode combination of the present invention, includes a metallic magnesium anode 12 in the form of a cup. The anode may also comprise magnesium base alloys. The anode cup is lined with a separator 14 for insulating the anode and cathode of the cell from each other and for providing a low resistance path for the flow of ions. An absorbent kraft paper is suitable for the separator. The cathode 16 of the cell is deposited within the lined anode cup 12.

According to the invention, the cathode 16 consists essentially of sulfur. For the purposes of this invention, sulfur is the preferred cathode material on account of its high theoretical capacity and voltage and its relative abundance and cheapness. A suitable sulfur cathode is prepared, by intimately mixing 50 grams of powdered sulfur, 5 grams of powdered graphite, and 5 grams of acetylene black. The graphite and acetylene black are provided to impart the desired electrical conductivity to the sulfur electrode.

The powdered cathode mixture is moistened by a sufficient quantity, approximately 50 cc., of a solution of an electrolyte to bring the powder to a dough-like consistency suitable for molding the cathode bobbin into the desired shape. The electrolyte may be a solution of an acidic agent such as magnesium bromide, strontium bromide, ammonium bromide, magnesium chloride. A solution containing 190 grams of magnesium bromide per liter of water is suitable for the acidic electrolyte. Other solutions containing up to 250 grams of magnesium bromide per liter of water may also be used. The cathode bobbin is pressed into shape under pressure sufficient to insure adequate conductivity.

If magnesium is selected as the anode material, the preferred electrolyte is magnesium bromide. Such a magnesium electrode is preferably an alloy of 3% aluminum, 1% zinc, 0.2% manganese, 0.15% calcium and 95.65% magnesium. With such an anode-electrolyte combination, an alkali or alkaline earth chromate or dichromate is added to the electrolyte to inhibit corrosion of the magnesium electrode.

In general, in selecting an electrolyte for a cell, the primary requirements are that the material be conductive and that it not react unduly with the various components of the cell. Substantially any electrolyte which satisfies these requirements may be employed.

The cathode bobbin has a carbon rod 18 inserted therein to provide electrical connection thereto. The cell is sealed in any suitable manner, for example, by an insulating washer 20 mounted on the carbon rod and a layer of hard wax 22 on the washer and sealing the cup 12. A metal cap 21 is placed on rod 18.

In the preparation of the sulfur cathode, the relative percentages of sulfur and graphite and acetylene black are not critical and may be varied over a wide range, for example from sulfur alone to a mixture comprising one part sulfur to 2 parts acetylene black. The conductivity of the cell may be varied by thus changing the amounts of graphite and acetylene black. However such a change also alters the capacity of the cell with an increase in graphite or acetylene black increasing conductivity but reducing capacity. Thus, the particular proportions of these materials employed depends on the application for which the cell is intended.

In addition, the quantity of electrolyte mixed with the cathode powder is not critical since the method of handling and formation of the cathode bobbin is the determining factor.

A sulfur cathode has a theoretical capacity of 79.1 ampere-minutes per gram which is a considerably greater capacity than other cathode materials presently employed in certain cells. For example, manganese dioxide has a theoretical capacity of 18.5, mercuric oxide has a theoretical capacity of 14.9 and copper oxide has a theoretical capacity of 41.4.

The sulfur-zinc cells provide a potential of 1.07 volts. The sulfur-magnesium cells provide a potential of 1.90 volts.

It is to be understood that the principles of the invention may be applied to cells of different shapes, sizes, and general constructional details and to both wet and dry type cells.

What is claimed is:

1. A primary cell including a cathode consisting essentially of 50 parts by weight of powdered sulfur, 5 parts by weight of acetylene black and 5 parts by weight of powder graphite, a quantity of magnesium bromide electrolyte having a concentration of 190 grams of magnesium bromide per liter of water and an anode consisting essentially of magnesium.

2. A primary cell including a cathode consisting essentially of sulfur, an aqueous electrolyte consisting essentially of magnesium bromide, and an anode consisting essentially of magnesium.

3. A primary cell according to claim 2 wherein the cathode includes a conductive material selected from the group consisting of graphite and acetylene black.

4. A primary cell according to claim 2 including a material to inhibit the corrosion of said anode, said material selected from the group consisting of alkali chromates, alkali dichromates, alkaline earth metal chromates, and alkaline earth metal dichromates.

5. A primary cell according to claim 2 wherein said anode consists essentially of a magnesium base alloy.

(References on following page)

References Cited in the file of this patent

UNITED STATES PATENTS

| | | |
|---|---|---|
| 361,794 | Walker | Apr. 26, 1887 |
| 1,255,283 | Benner et al. | Feb. 5, 1918 |
| 2,547,909 | George et al. | Apr. 3, 1951 |
| 2,612,533 | Blake | Sept. 30, 1952 |

FOREIGN PATENTS

| | | |
|---|---|---|
| 1,289,366 | France | Dec. 31, 1918 |

OTHER REFERENCES

"Primary Batteries" by Vinal, page 47; copyright 1950.